Nov. 20, 1934.  H. T. MUSTONEN  1,981,603
AUTOMATIC ROASTER APPARATUS
Filed Nov. 3, 1931  8 Sheets-Sheet 1

INVENTOR
Henry T. Mustonen
BY HIS ATTORNEY

INVENTOR
Henry T. Mustonen
BY HIS ATTORNEY

Nov. 20, 1934.  H. T. MUSTONEN  1,981,603
AUTOMATIC ROASTER APPARATUS
Filed Nov. 3, 1931  8 Sheets—Sheet 3

INVENTOR
Henry T. Mustonen
BY HIS ATTORNEY

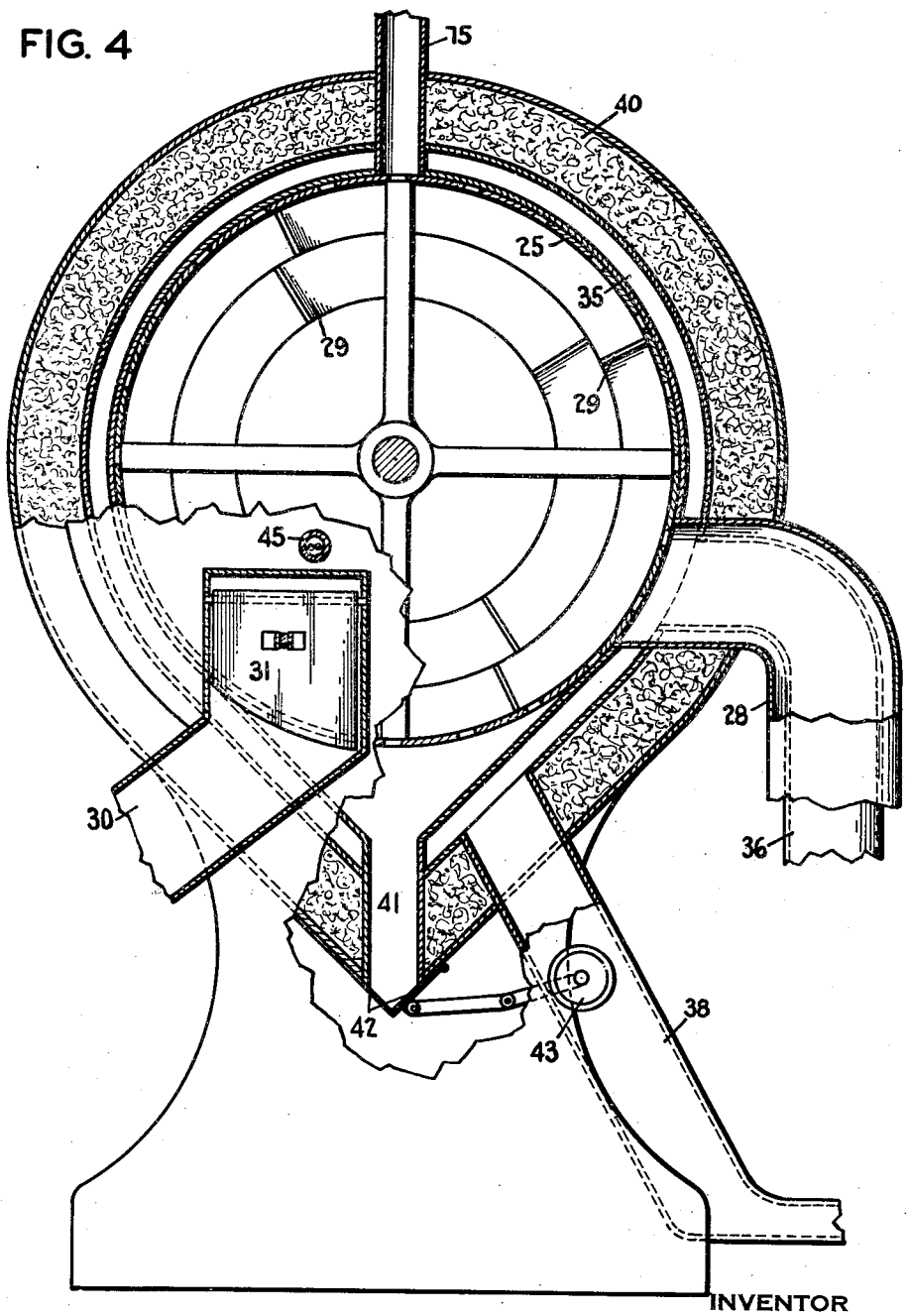

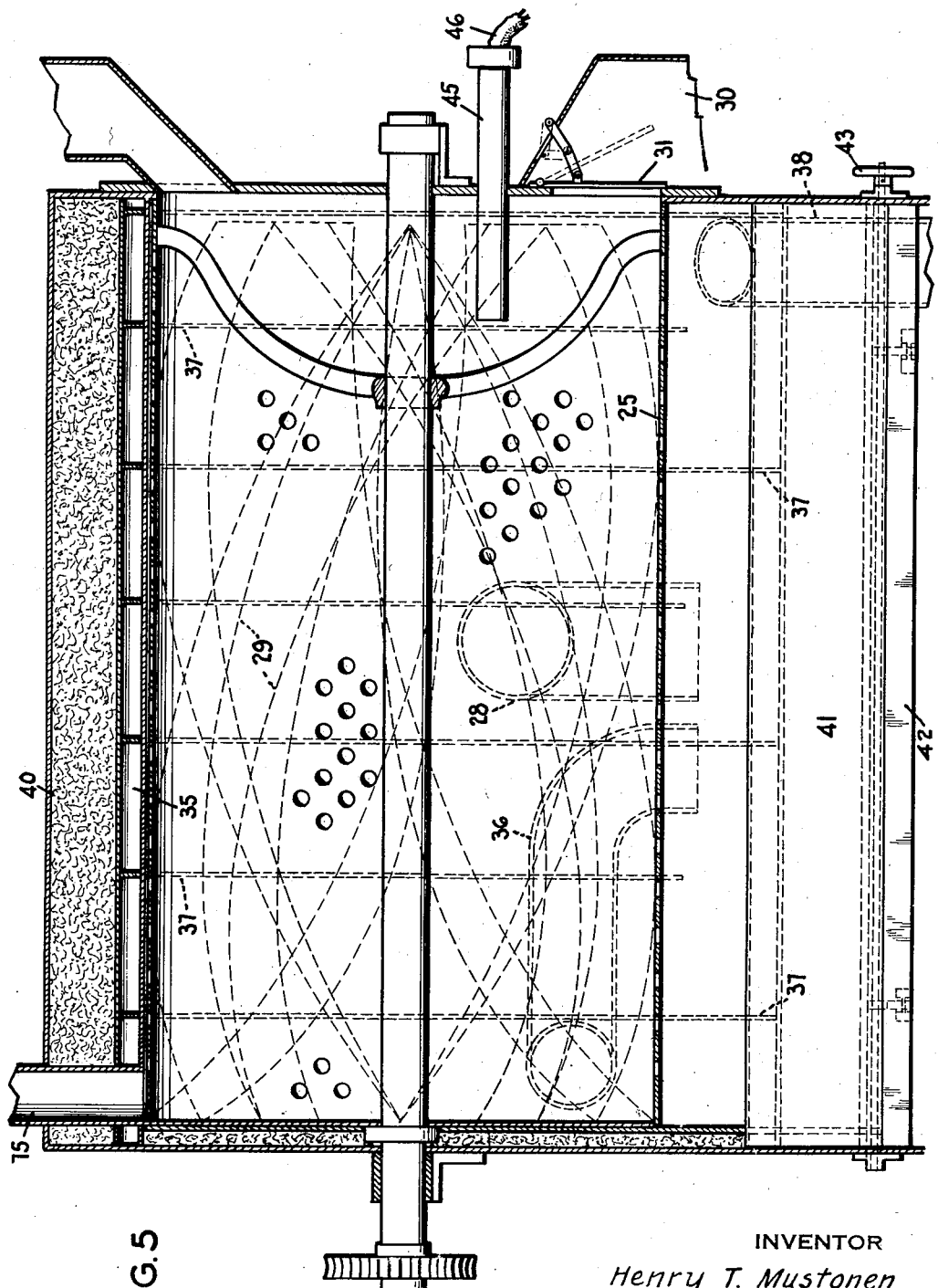

Nov. 20, 1934.  H. T. MUSTONEN  1,981,603
AUTOMATIC ROASTER APPARATUS
Filed Nov. 3, 1931   8 Sheets-Sheet 6

INVENTOR
Henry T. Mustonen
BY HIS ATTORNEY

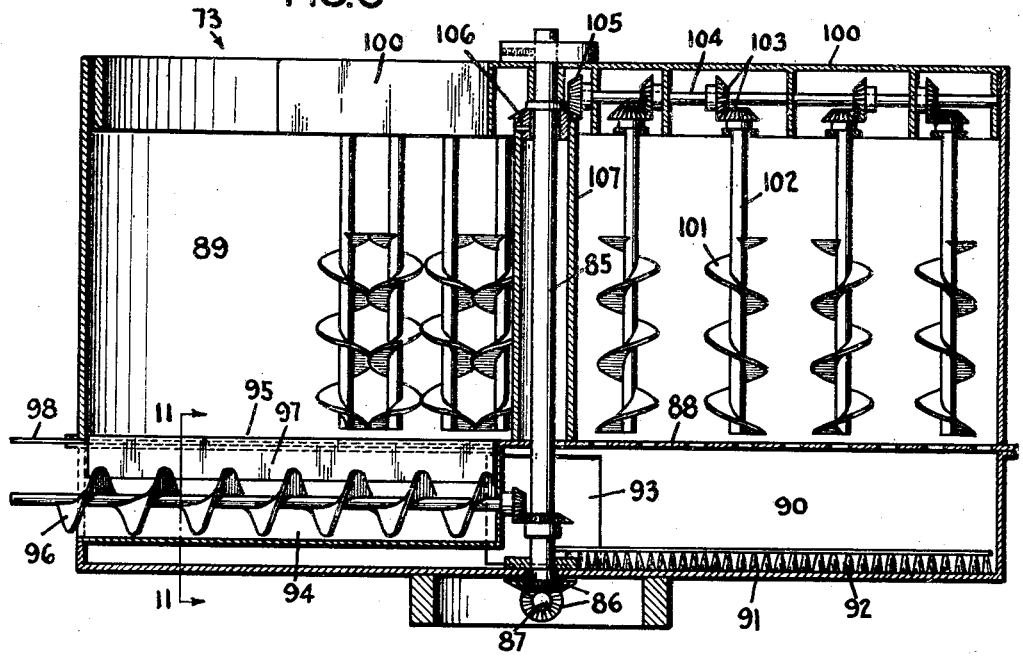
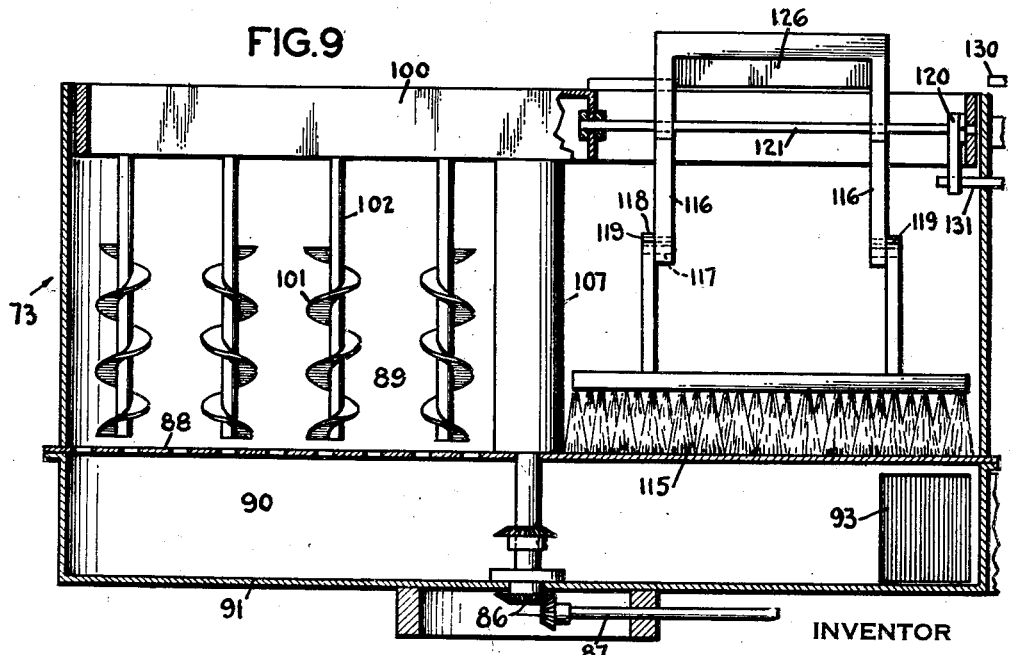

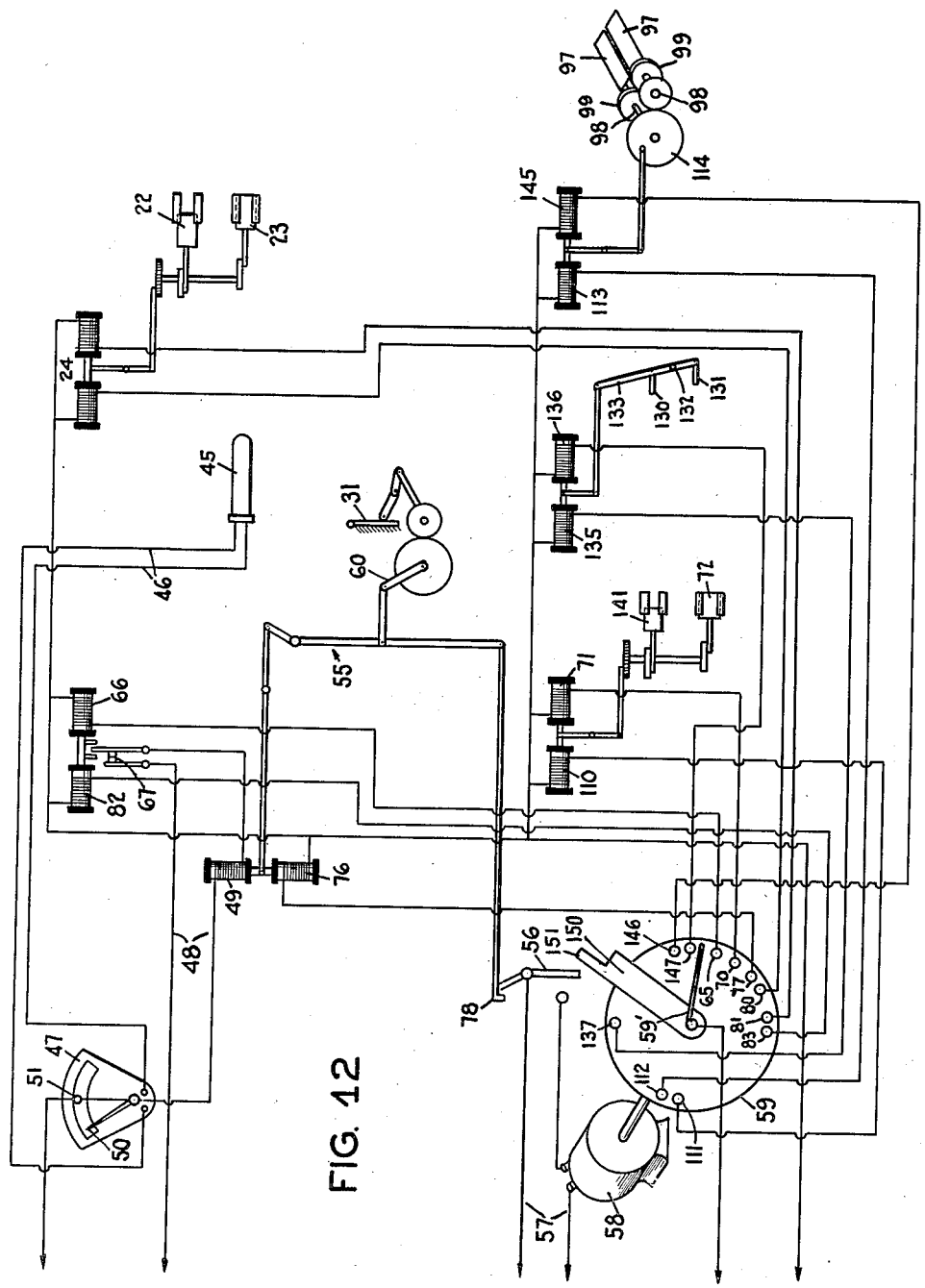

Patented Nov. 20, 1934

1,981,603

UNITED STATES PATENT OFFICE 1,981,603

AUTOMATIC ROASTER APPARATUS

Henry T. Mustonen, Little Neck, N. Y.

Application November 3, 1931, Serial No. 572,797

6 Claims. (Cl. 34—5)

The invention relates to apparatus for the roasting of coffee, cocoa, peanuts and the like in a continuous process, more particularly to means for effecting this operation automatically. Automatic means for supplying a charge of the material to a heated roasting device and for discharging the same therefrom into cooling apparatus from which it is to be eventually delivered under air suction, is known; and the invention has for one of its objects the provision of a novel roaster device; also, the provision of means for more effectively cooling the material discharged therefrom, and for removing foreign matter from the cooling apparatus.

A further object of the invention resides in the provision of a novel timing regulator for the various devices and under the control of the material temperature as the said material is being heated in the roaster.

In carrying out the invention, a charge, for example of coffee, is introduced automatically from a measuring hopper to roasting apparatus from which a roasted charge has previously been automatically discharged as the same attained a predetermined temperature, a pyrometer, thermostat or the like being arranged to be located within the body of the charge and initiating the operation of various mechanisms when the desired coffee temperature has been attained.

From the roaster, which is so designed that no flame or direct fire contact is had with the charge, the latter flows by gravity into a cooling device. This device embodies revolving and rotatable lifting elements designed to elevate the coffee beans or like material from the lower portion of said cooler device and then drop the same through the atmosphere therein.

Means are provided, also, for initiating a sweeping action over the floor of the cooler device to sweep out the charge of coffee after a predetermined interval, the coffee thus swept out being received by a pneumatic lifter apparatus for further separation of foreign matter such as stones and the like and for delivery into a dispensing hopper.

The automatic arrangements are such that the thermostatic device closes a circuit to an electric motor for a timing member which successively closes secondary circuits to electrical means for actuating the various devices utilized in the charging, roasting, cooling and delivery of the coffee, the timing member eventually breaking the circuit to its actuating motor for repetition of a cycle.

The nature of the invention, however, will best be understood when described in connection with the accompanying drawings, in which:

Fig. 4 is a fragmentary vertical section through the roaster, and on an enlarged scale; and Fig. 5 is a similar longitudinal section through the roaster.

Fig. 8 is a vertical section therethrough taken on the line 8—8, Fig. 7.

Fig. 9 is a further vertical section through the cooler and taken on the line 9—9, Fig. 7, and looking in the direction of the arrows.

Fig. 12 is a wiring diagram illustrating the electrical connections to the various electrical apparatus for effecting the different regulations and controls.

Figure 1:
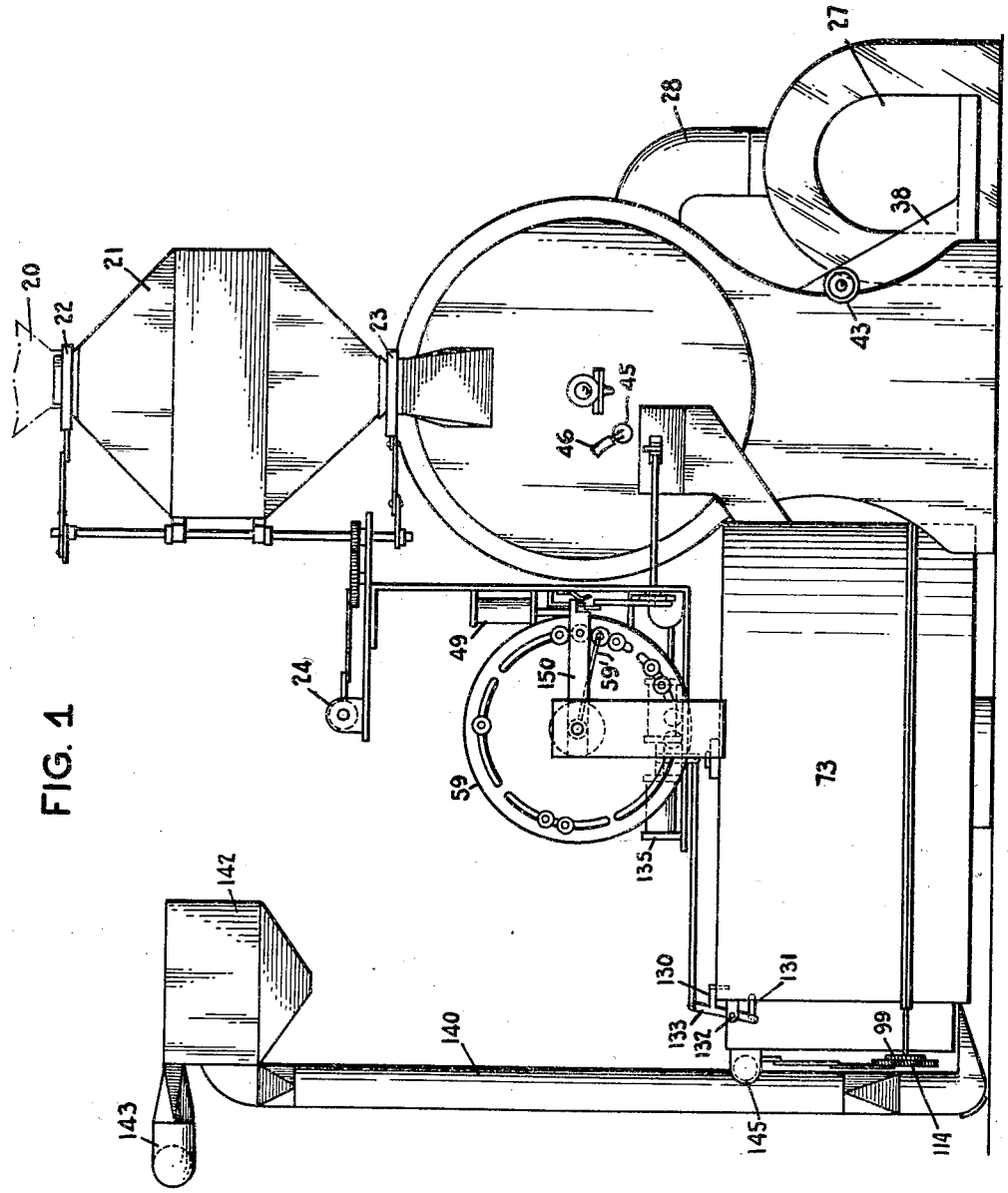
Fig. 1 is a front elevation of the novel coffee roasting apparatus.
Figure 2:
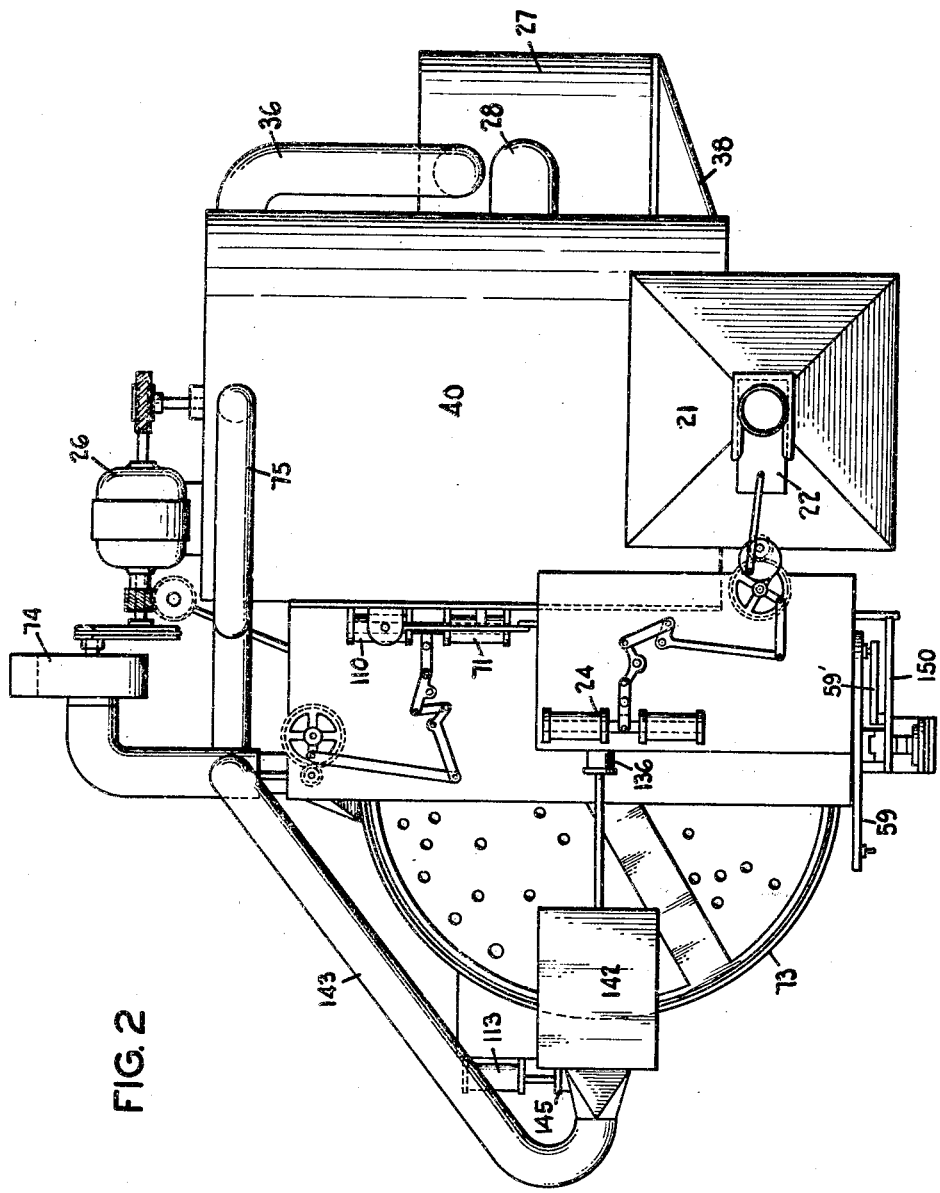
Fig. 2 is a plan thereof.
Figure 3:
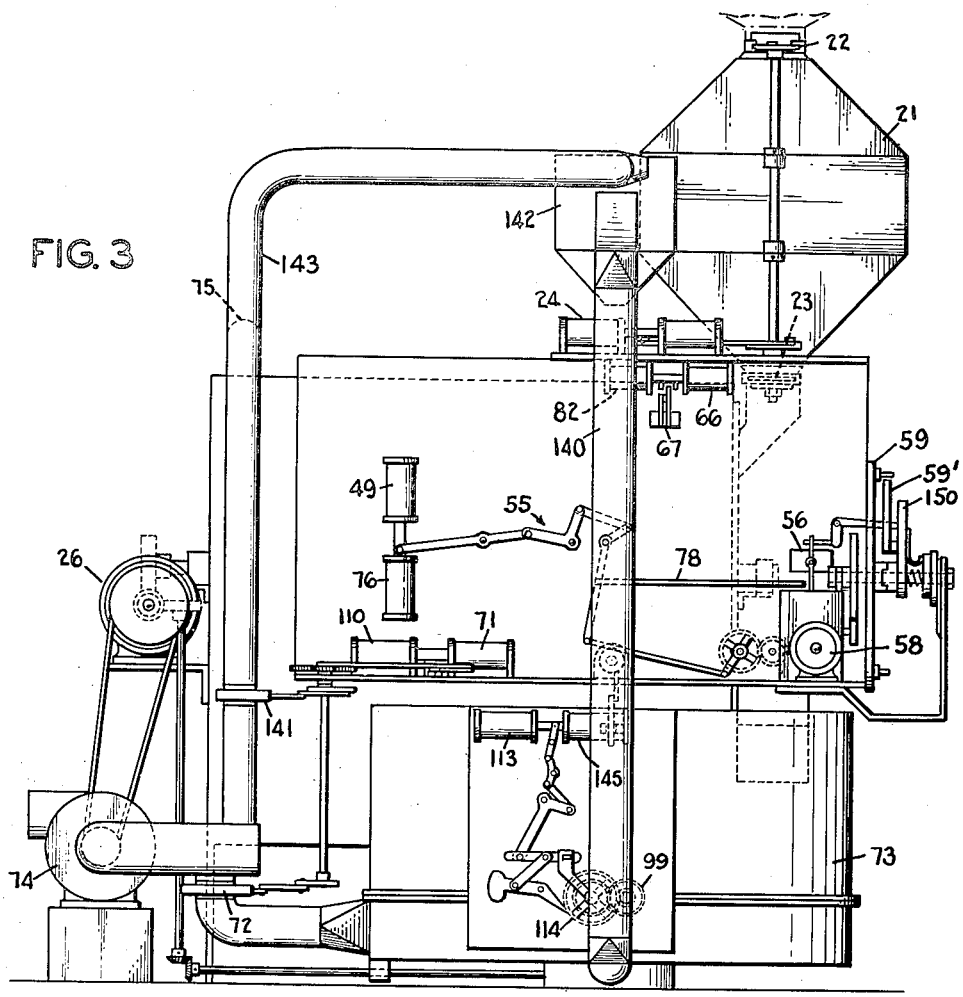
Fig. 3 is a side view of the apparatus.
Figure 6:
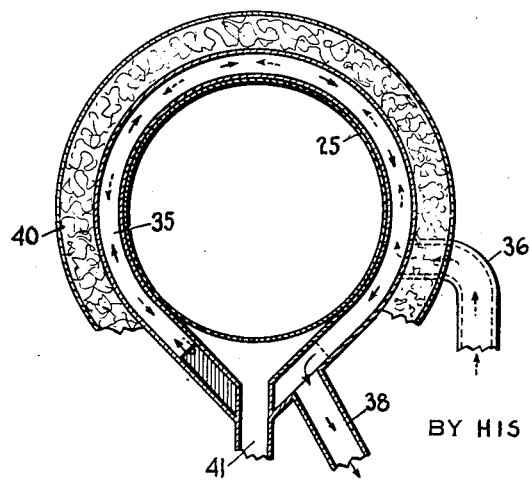
Fig. 6 is a fragmentary elevation, in part vertical section, illustrating the flow of heated gases through the jacket surrounding the roaster.
Figure 7:
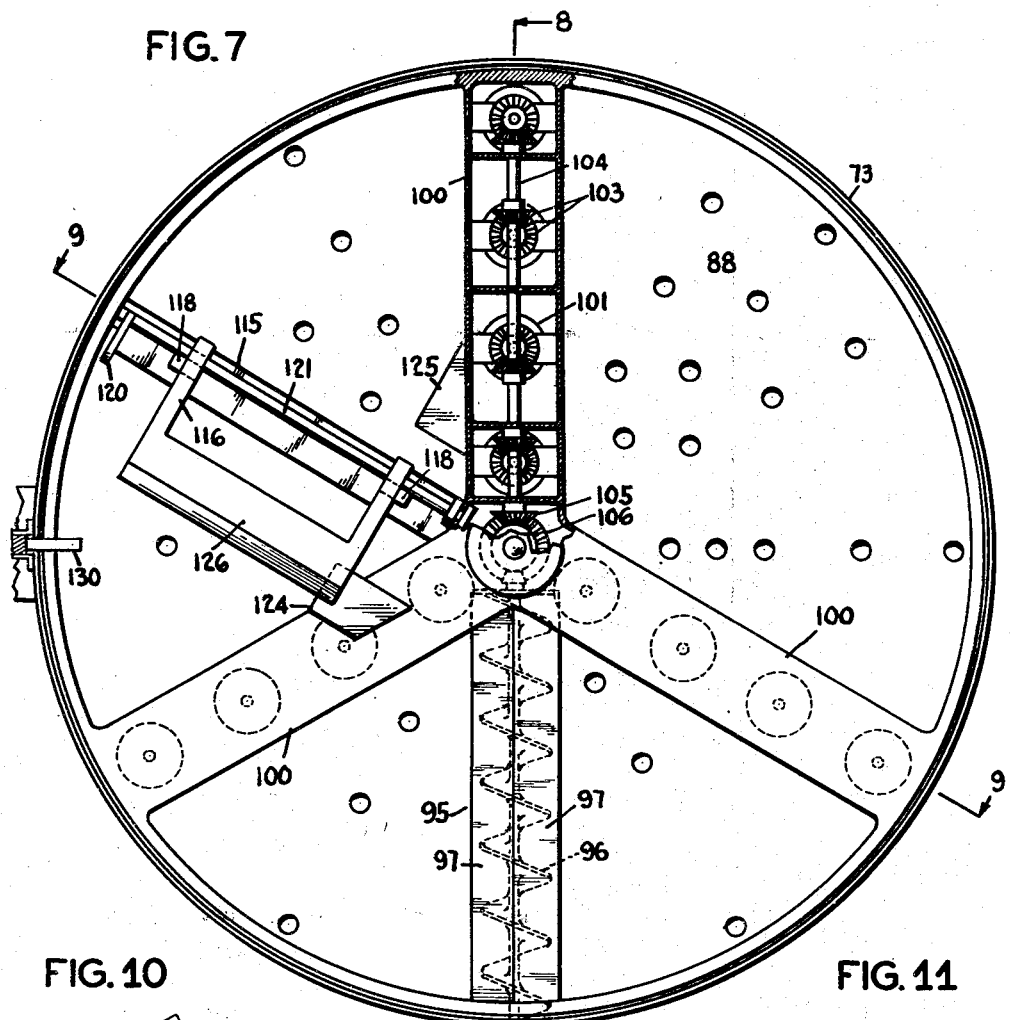
Fig. 7 is a plan view of the cooler for the material discharged from the roaster.

Referring to the drawings, the coffee or like material to be roasted is stored in a bin or the like 20 from which it is to be automatically discharged into a measuring hopper 21 for eventual discharge therefrom into the roasting device, a slide 22 at the entrance portion of the hopper and a slide 23 at the exit portion thereof being provided and actuated through intermediate mechanism from electromagnetic means comprising a pair of solenoids 24. The operation of these solenoids and intermediate mechanism is such, and as is well understood, that when one of the pair is energized, the slide 22 will be opened and the slide 23 simultaneously closed, while when the other of the pair of solenoids is energized the reverse action will take place.

The roaster comprises the usual perforated cylindrical element 25 mounted for rotation, and the same is suitably rotated from an electric motor 26. Contrary to the usual practice, however, the coffee within the cylinder is not exposed directly to flame, as from internal jets or from flames beneath the same, but heated gases are conveyed thereto from a suitable furnace 27 through the duct 28. The cylinder is provided, furthermore, with the usual flights 29 for stirring up the coffee as the cylinder rotates, and an outlet 30 communicates with the one end of the cylinder and to which the flights direct the said coffee for discharge, a door 31 being provided thereat and normally maintained closed. This door is also under the control of electromagnetic means designed both to open the door and to close the same.

In order to better maintain the heating effect within the cylinder 25, the latter is arranged to be surrounded by a substantially cylindrical jacket 35 to which the heated gases from the furnace are also conducted, this being effected by a further duct 36 which is designed to supply the cylindrical jacket 35 with heated air, the stream of heated air being constrained to a more or less helical path advancing longitudinally about said roasting cylinder, as in the provision of the baffles 37 or sub-dividing walls therein, eventually being discharged through the outlet 38. About the jacket 35 is provided a heavy layer of insulation material 40, and this, together with the said jacket, is directed tangentially to the roasting cylinder at its lower portion to provide a chamber 41 for collecting refuse and foreign matter included with the coffee being roasted and discharged through the perforations of the roasting cylinder. An angular trap door 42 is provided at the bottom of this chamber and may be opened through the operation of a hand wheel 43 to remove accumulated refuse.

A thermocouple or like thermostatic device 45 is inserted into the interior of the roasting cylinder 25 and is designed to thus be subjected to the actual temperature of the coffee itself substantially at its point of discharge. A pair of leads 46 connects this thermocouple with an automatic temperature regulator 47, of any well known or special design, which is adapted to supply current from a suitable source (not shown) through the mains 48 to a solenoid 49 when the pointer or index element 50 of said regulator device registers a predetermined temperature to which the regulator mechanism has been set and as indicated by the contact 51 thereof.

In the closing of this circuit to solenoid 49, the latter, through intermediate linkage 55, actuates a switch member 56 to close a motor circuit 57 to the motor 58 which rotates a timing disk 59 provided with various contact points, as will hereinafter be more fully described, and over which is adapted to move a contact brush 59' to close further circuits to the various regulating devices for the different members of the roaster apparatus. The action of the solenoid 49, furthermore, effects also, through intermediate mechanism 60, the opening of the outlet door 31 from the roasting cylinder.

As the contact brush 59' then engages with the first of the contacts of the timing device, as the contact 65, it closes the circuit to a further solenoid 66 to energize the same and opening thereby a switch 67 in the circuit of solenoid 49 and thus de-energizing this solenoid as well as rendering the automatic temperature regulator 47 temporarily ineffective.

At the next step, to wit: the contact 70, the solenoid 71 of a pair of cooperating solenoids is energized and is adapted to actuate thereby a slide or shutter 72 for connecting cooling apparatus 73 with suction means and into which cooling means the heated coffee is discharged from the roaster. This suction means may comprise the fan or blower 74 driven from the motor 26 and from which fan is also had a connection 75 to the cylindrical roaster for removing the products of combustion delivered thereto and fumes developed in the roasting of the coffee.

After the coffee has thus been discharged into the cooling device to have its temperature lowered therein as in the manner hereinafter set forth, provision is made for introducing another charge of coffee into the roasting cylinder from the measuring hopper 21 and then to effect recharging said hopper. To this end, the door 31 of the roasting cylinder must first be closed, which is accomplished through the energization of the solenoid 76 as the brush 59' engages with the next succeeding contact 77. The actuation of the solenoid thus restores the linkage 55 and intermediate mechanism 60 to the initial position and similarly returns the switch-throwing arm 78 of switch 56 to its original position.

Engagement successively with the next contact 80 and the next succeeding contact 81 causes the pair of solenoids 24 to be successively energized for first opening the slide 23 and simultaneously therewith closing slide 22 to deliver a measured charge into the roasting cylinder, and then closing slide 23 and opening slide 22 simultaneously therewith to take in a further charge into the hopper 21 from the bin 20. As a cool charge of coffee now surrounds the thermocouple 45, it will be possible to restore the controlling circuit 48 to its operative condition, that is to say, to be closed at the contact 51 when the pointer element 50 thereof attains the position corresponding to the temperature to which the regulating instrument 47 has been set and which is the ultimate temperature to which it is desired to subject the material to be roasted. It is therefore necessary to close the switch 67 which may be accomplished through the action of a further solenoid 82, associated with solenoid 66 and included in circuit with the contact 83 and adapted to be completed when the brush 59' comes into engagement with said contact.

The conditions are now such that there is a charge being roasted in the roasting cylinder 25 and a charge being cooled in the cooling device 73. This latter is of special design to effectively reduce the temperature of the coffee therein and is shown more particularly in Figs. 7–11 of the drawings. Reference being had to these figures, the cooler is indicated as consisting of a stationary cylindrical body having a central vertical shaft 85 which is arranged to be rotated through the bevel gear wheels 86, shaft 87 and intermediate transmitting mechanism from the motor 26 and adapted to be continuously rotated thereby. The cylindrical cooler is divided vertically by a perforated flooring 88 into an upper compartment 89 in which the coffee is received from the roasting cylinder and a lower compartment 90 over the bottom 91 of which is arranged to rotate a radial brush 92 secured to the shaft 85 for sweeping out any foreign matter and dust falling through the perforations of the floor 88, the same being removed through the duct 93 which is in communication with fan 74 when the shutter or slide 72 is in the open position. In this compartment is also a radially disposed delivery chamber 94 located immediately below a corresponding opening 95 in the floor 88, and a spiral conveyor 96, for example, operates therein to discharge the cooled coffee from the cooling device. However, during the cooling action upon the coffee, the opening 95 remains normally closed, as by means of a pair of shutters 97 lying flush with the floor 88 and movable with the shafts 98 of a pair of corresponding meshing gear wheels 99, Fig. 11 of the drawings. One of these gear wheels is designed to be oscillated from a suitable pair of solenoids, as hereinafter set forth, to cause the shutters 97 to be dropped and to permit the coffee thereby to fall into the conveyor 96.

Provision is also made during this period for sweeping the cooled coffee beans from the floor toward said opening 95 therein.

In order to more effectively and rapidly cool the coffee when a charge has been delivered to the compartment 89, a plurality of radially disposed arms 100 are mounted at the upper portion of the chamber 89, being secured to the shaft 85 for rotation therewith, and each carries a plurality of vertically disposed lifting members 101 which may be in the nature of helical lifting surfaces. The successive lifting members carried by an arm are preferably caused to rotate in opposite directions, the helical lifting surfaces being correspondingly arranged upon the shafts 102 carrying the same. These shafts are driven through bevel gears 103 on a horizontally disposed shaft 104 which derives its rotation from a bevel gear 105, through the rotation of the arms 100, meshing with a fixed bevel gear 106 mounted on a stationary sleeve 107 located about the shaft 85.

In this manner not only are the lifting members revolved about said shaft 85, but the same possesses an individual rotation whereby, through the helical surfaces or flights 101 arranged at a suitable angle, the coffee beans are gathered up from the bottom of the compartment and are then caused to fall downwardly through the air circulating therein.

After a predetermined period of time has elapsed, provision is made to discharge the coffee from the cooler, and to this end the suction to the lower compartment 90 is first cut off by actuating the slide 72 through energization of the companion solenoid 110 of solenoid 71, this energization occurring when contact 111 is engaged by the brush 59'.

Thereupon, when the next succeeding contact 112 is engaged by arm 59', the solenoid 113 will be energized to oscillate, through intermediate mechanism, a gear wheel 114 on a shaft 98 of one of the meshing gear wheels 99 to cause the shutters 97 to be depressed and afford the radial opening 95 in the floor of the compartment above the conveyor 94.

It is desirable in the discharge of the coffee from the cooler that means be provided during this period for sweeping the coffee beans toward the said opening 95; and to this end radially-disposed brushes 115, which normally are held above the floor 88, are caused to be dropped into position from an arm 100 for effecting a sweeping action thereover. For example, the brushes may be hung from a bell-crank frame or the like 116, being pivoted to one arm thereof as at 117 such that when the frame 116 is substantially in vertical position the brushes 115 will depend vertically therefrom and have an arm 118 extending beyond the pivotal point 117 for engagement with a stop pin 119 on the frame 116. This pin is so disposed that it will afford a resistance when the brushes are rotated over the floor 88 in the direction indicated by the arrow.

Figure 10:
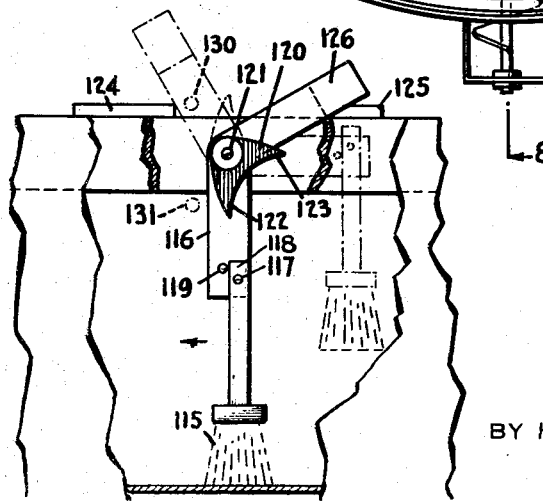
Fig. 10 is a view in elevation and part vertical section illustrating the brush control mechanism.
Figure 11:
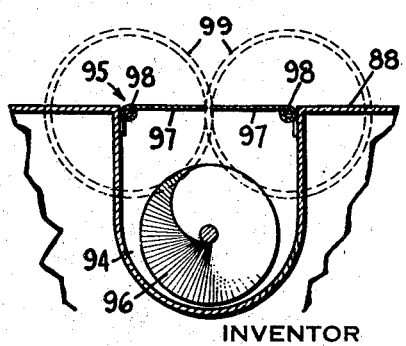
Fig. 11 is a transverse section on an enlarged scale, taken on the line 11—11, Fig. 8.

However, when the frame 116 is swung to a horizontal position, as indicated in the broken line position, Fig. 10 of the drawings, the brush will swing about the pivotal point 117 maintaining its vertical depending position therefrom, but will be correspondingly elevated from the floor.

This swinging of the frame 116 may be accomplished through the action of a member 120 fixed to the rock shaft 121 of the frame 116 and having the oppositely engaging fingers 122 and 123. Stops 124 and 125, respectively, are provided to limit the oscillation of frame 116 to a substantially vertical and horizontal position, through engagement of an upward extension 126 of said frame. The brushes are retained in one of the other positions in accordance with engagement of the cam fingers 122 and 123, respectively, with one or the other of a pair of pins 130 and 131 mounted upon opposite sides of the pivotal point 132 of a rocking arm 133 controlled in the manner hereinafter set forth. These pins are arranged to extend into the cooling chamber and to contact, in accordance with the extent of their projection therein, with one or the other of the said fingers 122 and 123 as a said pin comes into the path of the cam 120 carried by the framing for the rotatable revoluble lifting devices in their revolution in the cooler.

To shift the pins 131 and 132 into engaging position or out of engagement with the cam fingers, a further pair of corresponding solenoids 135 and 136, is provided, the former being intended to rock pin 131 radially inwardly of the cooling cylinder when energized and for the purpose of setting the brushes in position to sweep the floor 88. This is accomplished when contact 137 is engaged by the brush 59'. Thereupon, the coffee will be swept out through the opening 95 into the conveyor 96 and is discharged thereby into a delivery duct 140, a shutter or slide 141 being provided in a suction connection 143 and controlled simultaneously with the operation of shutter or slide 72.

Duct 140, in turn, communicates with a dispensing bin 142 to which the suction connection 143 is had to the fan to develop sufficient vacuum in the bin 142 to effect lifting of the roasted and cooled coffee therein, and as is the usual practice.

After the coffee has thus all been discharged from the cooling device and lifted into the dispensing bin 142, the shutters 97 are arranged to again close the opening 95 through energization of the companion solenoid 145 of solenoid 113. This will occur when the contact 146 is engaged by brush 59'. Thereupon, the brush is also to be lifted from the floor which is accomplished through energization of solenoid 136 as the contact 147 is engaged through further movement of the brush 59'.

The cycle is thus complete with the exception of cutting off the timing means until the charge still remaining in the roaster shall have attained the proper roasted temperature and which will be indicated by the regulator device 47, this device then again initiating a further cycle of operations.

In order to terminate the action of the timing device, provision is made to open the switch 56 shortly after the last contact 147 has been wiped by brush 59'; and an arm 150 to this end may be secured to the shaft of the timer 59 to rotate therewith, and it is provided with the finger 151 adapted to wipe the blade of switch 56 to open said switch, in manner well understood. The motor circuit 57 is thereby opened to terminate operation of the motor and associated timing device until such time as the regulating apparatus 47 shall again initiate a cycle of operations.

I claim:

1. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of automatically operating electrical timing mechanism continuously operative during a cycle for controlling successively the means for discharge of the roasted charge into the cooler, the means for admitting cooling air to the cooler, the means for cutting off the supply of cooling air thereto, and the means for removing the charge from the cooler, an electric motor and circut to drive the automatically operating timing mechanism, means to restore the automatically operating timing mechanism to its initial condition, and means controlled solely by the temperature of the charge within the roaster for effecting closing of the motor circuit to initiate the operation of the said automatically operating timing mechanism and at the beginning of the cycle.

2. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of automatically operating electrical timing mechanism continuously operative during a cycle for controlling successively the means for discharge of the roasted charge into the cooler, the means for admitting cooling air to the cooler, the means for cutting off the supply of cooling air thereto, and the means for removing the charge from the cooler, an electric motor and circuit to drive the automatically operating timing mechanism, means to restore the automatically operating timing mechanism to its initial condition, a regulator device, and thermo-responsive means connected with the regulator device and subjected to the temperature of the charge within the roaster for effecting closing of the motor circuit to initiate the operation of the said automatically operating timing mechanism and at the beginning of the cycle.

3. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of automatically operating electrical timing mechanism continuously operative during a cycle for controlling successively the means for discharge of the roasted charge into the cooler, the means for admitting cooling air to the cooler, the means for cutting off the supply of cooling air thereto, and the means for removing the charge from the cooler, an electric motor and circuit to drive the automatically operating timing mechanism, means to restore the automatically operating timing mechanism to its initial condition, means controlled solely by the temperature of the charge within the roaster for effecting closing of the motor circuit to initiate the operation of the said automatically operating timing mechanism and at the beginning of the cycle, and means automatically controlled by the said timing mechanism for temporarily rendering the said initiating means ineffective.

4. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of automatically operating electrical timing mechanism continuously operative during a cycle for controlling successively the means for discharge of the roasted charge into the cooler, the means for admitting cooling air to the cooler, the means for cutting off the supply of cooling air thereto, and the means for removin the charge from the cooler, an electric motor and circuit to drive the automatically operating timing mechanism, means to restore the automatically operating timing mechanism to its initial condition, means controlled solely by the temperature of the charge within the roaster for effecting closing of the motor circuit to initiate the operation of the said automatically operating timing mechanism and at the beginning of the cycle, and means automatically controlled by the said timing mechanism for rendering the said initiating means ineffective immediately after a charge has been withdrawn from the roaster and until a new charge has been supplied thereto.

5. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of electrically operated means for controlling the means for discharge of the roasted charge into the cooler, the means for admitting cooling air to the cooler, the means for cutting off the supply of cooling air thereto, and the means for removing the charge from the cooler, a rotatable electrical timing device for successively energizing the said electrically operated means, an electric motor and circuit to drive the timing device, a regulator device, and thermoresponsive means connected with the regulator device and subjected to the temperature of a charge within the roaster, said regulator device being adapted to close the motor-circuit of the motor for the rotatable timing device when the charge has attained a predetermined temperature, and said timing device at the completion of its cycle interrupting the motor-circuit.

6. In apparatus for the purpose specified: the combination with a roaster, means to supply a measured charge thereto, means to discharge a roasted charge therefrom, a cooler to receive the roasted charge, means for admitting cooling air to the cooler, means to cut off the supply of cooling air, and means to remove the cooled charge from the cooler; of electrically operated means for controlling the means for discharge of the roasted charge into the cooler, the means for admitting cooling air to the cooler, the means for cutting off the supply of cooling air thereto, and the means for removing the charge from the cooler, a rotatable electrical timing device for successively energizing the said electrically operated means, an electric motor and circuit to drive the timing device, a regulator device, thermoresponsive means connected with the regulator device and subjected to the temperature of a charge within the roaster, said regulator device being adapted to close the motor-circuit of the motor for the rotatable timing device when the charge has attained a predetermined temperature for effecting the starting of the electric motor, a controlling circuit for effecting the starting of the motor and in which the said regulator device is included in series, the said timing device at the completion of its cycle interrupting the motor circuit, and means controlled by the timing device to open the controlling circuit after the said motor has been started.

HENRY T. MUSTONEN.